(12) United States Patent
Urayama et al.

(10) Patent No.: US 10,167,378 B2
(45) Date of Patent: Jan. 1, 2019

(54) PROCESSING DEVICE AND PROCESSING METHOD OF FIBER CONTAINING RESIN

(71) Applicant: TOYOTA JIDOSHA KABUSHIKI KAISHA, Toyota-shi, Aichi-ken (JP)

(72) Inventors: Hiroshi Urayama, Nagoya (JP); Takahiro Takeuchi, Gamagori (JP); Keiichiro Oshima, Gamagori (JP); Ippei Noda, Gamagori (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 657 days.

(21) Appl. No.: 14/677,468

(22) Filed: Apr. 2, 2015

(65) Prior Publication Data

US 2015/0284541 A1  Oct. 8, 2015

(30) Foreign Application Priority Data

Apr. 8, 2014  (JP) ................. 2014-079469

(51) Int. Cl.
| | |
|---|---|
| *B01D 1/00* | (2006.01) |
| *C08K 7/06* | (2006.01) |
| *C10B 1/02* | (2006.01) |
| *D01F 9/12* | (2006.01) |
| *B29B 17/02* | (2006.01) |
| *C08J 11/10* | (2006.01) |
| *C10B 51/00* | (2006.01) |
| *C10B 53/07* | (2006.01) |
| *B29K 105/06* | (2006.01) |
| *B29K 307/04* | (2006.01) |
| *B29B 17/04* | (2006.01) |

(52) U.S. Cl.
CPC ............... *C08K 7/06* (2013.01); *B29B 17/02* (2013.01); *B29B 17/0206* (2013.01); *C08J 11/10* (2013.01); *C10B 1/02* (2013.01); *C10B 51/00* (2013.01); *C10B 53/07* (2013.01); *D01F 9/12* (2013.01); *B29B 2017/0293* (2013.01); *B29B 2017/0496* (2013.01); *B29K 2105/06* (2013.01); *B29K 2307/04* (2013.01); *Y02P 20/143* (2015.11); *Y02W 30/622* (2015.05); *Y02W 30/625* (2015.05)

(58) Field of Classification Search
CPC ............ B29K 2105/26; B29K 2105/16; B29K 2307/04
USPC ................ 977/778, 783, 788; 436/160, 155; 422/289
See application file for complete search history.

(56) References Cited

U.S. PATENT DOCUMENTS

| | | | |
|---|---|---|---|
| 2002/0017162 A1* | 2/2002 | Dannenhauer | B29B 17/021 75/10.13 |
| 2014/0120026 A1 | 5/2014 | Itazu et al. | |

FOREIGN PATENT DOCUMENTS

| | | |
|---|---|---|
| EP | 2 752 445 A1 | 7/2014 |
| JP | 7-33904 A | 2/1995 |
| JP | 2004-091719 A | 3/2004 |
| JP | 2005179135 A | 7/2005 |
| JP | 2005-255835 A | 9/2005 |
| JP | 2006167656 A | 6/2006 |
| JP | 2007-297641 A | 11/2007 |
| JP | 2008-13614 A | 1/2008 |
| JP | 2008-285601 A | 11/2008 |
| JP | 2013-064219 A | 4/2013 |
| JP | 2013-107973 A | 6/2013 |
| JP | 2013-199607 A | 10/2013 |

* cited by examiner

*Primary Examiner* — Natalia Levkovich
(74) *Attorney, Agent, or Firm* — Sughrue Mion, PLLC

(57) ABSTRACT

A processing method according to the present embodiment is a processing method of a fiber containing resin in which fibers are contained in a matrix resin. The processing method includes: a step of thermal decomposition of the matrix resin in the fiber containing resin; and a step of stirring a resulting fibers bundle in solvent after the thermal decomposition. At the time of the thermal decomposition, the matrix resin may be carbonized in a dry distillation-carbonization furnace, for example.

8 Claims, 2 Drawing Sheets

PROCESSING DEVICE AND PROCESSING METHOD OF FIBER CONTAINING RESIN

INCORPORATION BY REFERENCE

The disclosure of Japanese Patent Application No. 2014-079469 filed on Apr. 8, 2014 including the specification, drawings and abstract is incorporated herein by reference in its entirety.

BACKGROUND OF THE INVENTION

1. Field of the Invention

The present invention relates to a processing device and a processing method of a fiber containing resin.

2. Description of Related Art

In recent years, a fiber containing resin such as a carbon fiber reinforced plastic (hereinafter referred to as CFRP) has been used widely. In such a fiber containing resin, it is desired that fibers be recycled efficiently.

Japanese Patent Application Publication No. 2013-64219 (JP 2013-64219 A) describes a manufacturing apparatus for manufacturing recycled carbon fibers by use of a CFRP as a material. In the manufacturing apparatus described in JP 2013-64219 A, after a dry distillation step is performed in a dry distillation-carbonization furnace, the CFRP subjected to the dry distillation is cut in a predetermined size. Then, the CFRP thus cut is heated in a continuous furnace.

In a processing method of JP 2013-64219 A, carbides attached to surfaces of carbon fibers in the dry distillation-carbonization furnace are removed by heating in the continuous furnace. However, in the method of JP 2013-64219 A, the fibers are processed at a high temperature in the air atmosphere in the continuous furnace. Accordingly, the carbon fibers make contact with the air at the high temperature, so that the carbon fibers are oxidized to deteriorate. Alternatively, in a case where the carbon fibers are processed in the nitrogen atmosphere so as not to make contact with oxygen, it is necessary to supply nitrogen gas, which increases a process cost.

SUMMARY OF THE INVENTION

The present invention provides a processing method and a processing device each of which can reduce a strength degradation of fibers.

A processing method according to one aspect of the present invention is a processing method of a fiber containing resin, and includes: a step of thermal decomposition of a matrix resin in the fiber containing resin; and a step of stirring a resulting fibers bundle in solvent after the thermal decomposition. This makes it possible to reduce a strength degradation of the fibers. The processing method may further include a step of separation of the fibers stirring the resulting fibers bundle in the solvent. This makes it possible to easily reprocess the fibers. In the processing method, at the time of the thermal decomposition, the matrix resin may be carbonized in a dry distillation-carbonization furnace. Hereby, the matrix resin can be thermally decomposed efficiently.

In the processing method, the fiber containing resin may be a carbon fiber reinforced plastic in which carbon fibers are contained in a matrix resin, the matrix resin is a main component of the carbon fiber reinforced plastic.

A processing device according to one aspect of the present invention is a processing device of a fiber containing resin, and includes: a pyrolysis furnace for the use of thermal decomposition of a matrix resin in the fiber containing resin, a container for stirring a thermal decomposing fibers bundle in solvent equipped with a stirring machine, the stirring machine being for separation of carbides attaching to fibers by opening the fibers bundle. Hereby, the fibers can be opened without degrading strength of the fibers. The processing device may further include a device for separation of fibers from the solvent after stirring fibers bundle dispersion with the stirring machine. Hereby, the fibers can be separated efficiently.

In the processing device, the stirring machine includes a tank, to which a stirring bar having a rotating shaft with a mixing blade connecting to a motor was attached, for opening the fibers bundle in the solvent.

In the processing device, the device for separation of fibers is a pressurized filtration machine.

In the processing device, the pressurized filtration machine is composed of a pump, a filtration vessel because of transporting dispersion liquid by the pump, a gas supply pipe to pressurize inside the filtration vessel, a filter part arranged inside the filtration vessel and a waste tank to accumulate filtrate.

In the processing device, the pyrolysis furnace may include a dry distillation-carbonization furnace.

In the processing device, the dry distillation-carbonization furnace may include a body portion, a dry distillation-carbonization chamber placed inside the body portion, and a combustion chamber connected to the dry distillation-carbonization chamber.

In the processing device, the fiber containing resin may be a carbon fiber reinforced plastic in which carbon fibers are contained in the matrix resin, the matrix resin is a main component of the carbon fiber reinforced plastic.

In the processing device, opening the fibers bundle is to be separated to single fibers from the fibers bundle.

According to the present invention, it is possible to provide a processing method and a processing device each of which can reduce a strength degradation of fibers.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment of a processing method and a processing device according to the present invention in detail with reference to the drawings. However, the present invention is not limited to the following embodiment. Further, the following description and drawings are simplified appropriately for clarification of the description.

The processing method according to the present embodiment is a processing method of a fiber containing resin, and includes a thermal decomposition step of thermally decomposing a matrix resin in the fiber containing resin, and a step of stirring, in liquid, fibers contained in the fiber containing resin after the thermal decomposition step. Thus, carbon residues attached to fiber surfaces can be removed. Accordingly, the fibers can be opened easily. Further, since the fibers are not heat-treated in the oxygen atmosphere, it is possible to prevent degradation of fiber strength.

A processing object is a CFRP in which carbon fibers are contained in a matrix resin as a main component. The processing method according to the present embodiment reprocesses the CFRP. That is, when the CFRP is processed by the processing method according to the present embodiment, the carbon fibers contained in the CFRP are reusable.

Figure 1:
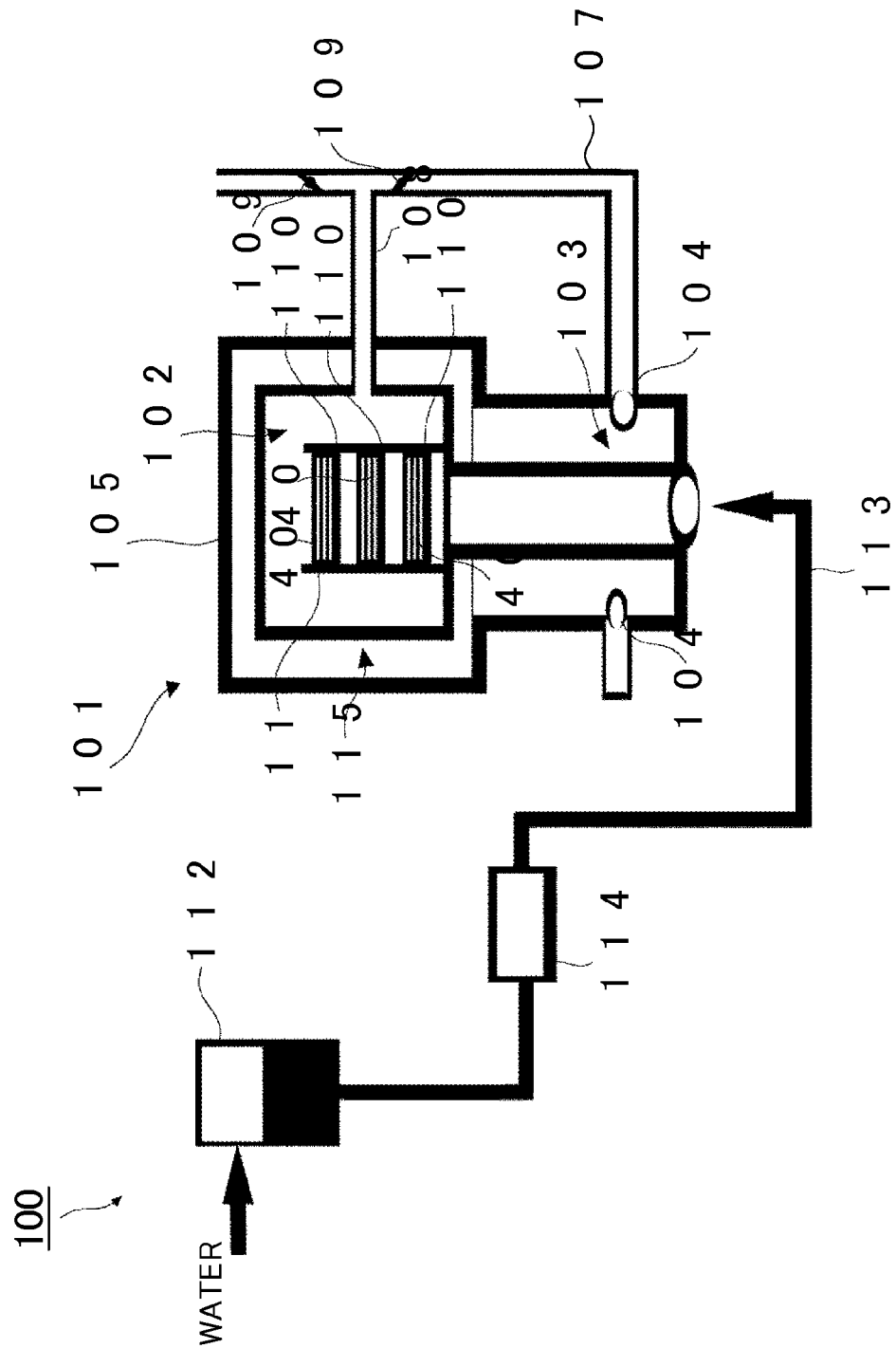
FIG. 1 is a view illustrating a dry distillation-carbonization furnace configured to perform a thermal decomposition step of a processing method according to the present embodiment.
Figure 2:
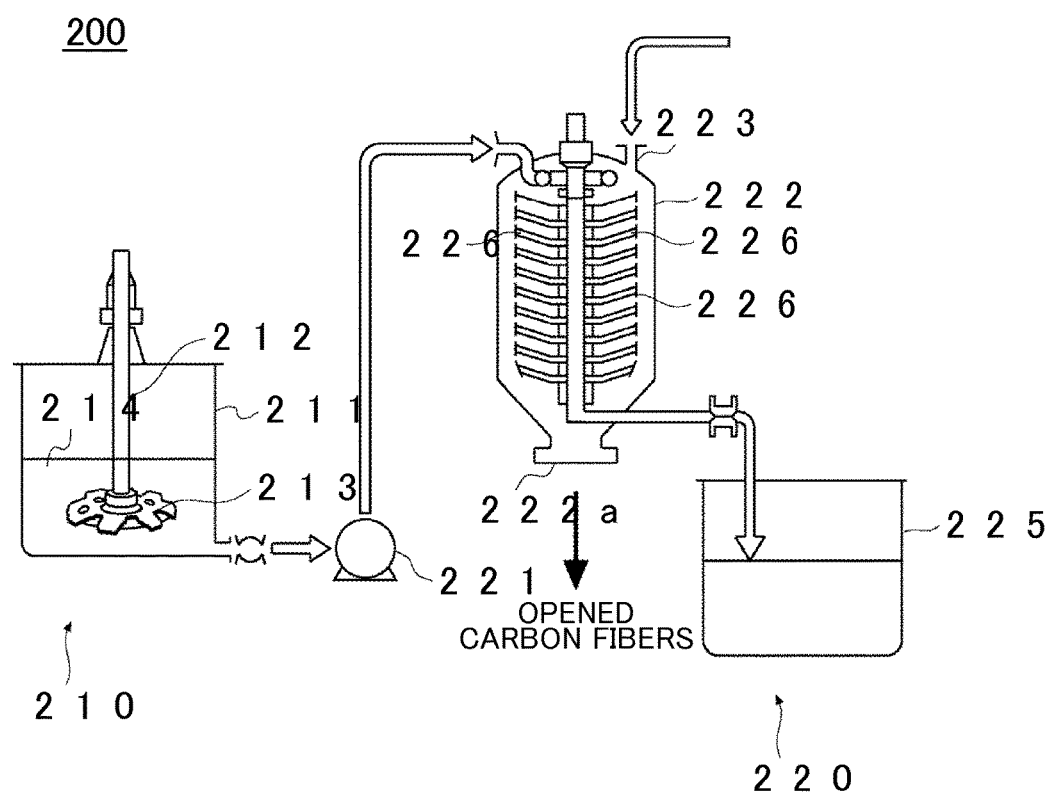
FIG. 2 is a view illustrating a device configured to perform a opening step of the processing method according to the present embodiment.

The following describes the processing device and the processing method of a fiber containing resin, according to the present embodiment, with reference to FIGS. 1 and 2. FIG. 1 is a view illustrating a device configuration of a dry distillation-carbonization furnace configured to perform the thermal decomposition step, which is a first step. FIG. 2 is a view illustrating a configuration of a device configured to perform a stirring step, which is a second step.

First described is a device configured to perform the thermal decomposition step as the first step in FIG. 1. A schematic configuration of a device 100 is illustrated in FIG. 1. The device 100 includes a dry distillation-carbonization furnace 101 configured to carbonize the matrix resin of the CFRP.

The dry distillation-carbonization furnace 101 includes a body portion 105, a dry distillation-carbonization chamber 102, and a combustion chamber 103. The body portion 105 is formed in a box shape having an opening. The body portion 105 is configured such that a sealing door (not shown) is attached to its front side. The dry distillation-carbonization chamber 102 is placed inside the body portion 105. The combustion chamber 103 is placed below the dry distillation-carbonization chamber 102. The body portion 105 and an outer wall of the dry distillation-carbonization chamber 102 are each made of heat-resistant metal.

A heat-resistant shelf 111 equipped with heat-resistant trays 110 is provided inside the dry distillation-carbonization chamber 102. A plurality of heat-resistant trays 110 is placed in the heat-resistant shelf 111. A CFRP 40 is arranged on the heat-resistant tray 110. The heat-resistant trays 110 are stacked on the heat-resistant shelf 111 with some intervals. The heat-resistant trays 110 are housed in the dry distillation-carbonization chamber 102. When the sealing door is closed, the dry distillation-carbonization chamber 102 enters a sealing state, so that carbonization and dry distillation can be performed in absence of oxygen. A matrix component of the CFRP 40 is partially decomposed into gas (dry-distilled gas) such as hydrocarbon by heating. Further, at this time, the matrix component is partially carbonized and changed into a powder shape or the like, and remains on surfaces of the carbon fibers.

The device 100 includes two burners 104. One of the burners 104 is configured such that fuel is supplied thereto so as to be burned. The other one of the burners 104 is configured such that dry-distilled gas is supplied thereto so as to be burned. Note that the dry-distilled gas is that gas of the matrix component which is generated in the dry distillation-carbonization chamber 102.

The inside of the dry distillation-carbonization chamber 102 communicates with the burners 104 via a gas burning pipe (not shown). The dry-distilled gas generated by the dry distillation in the dry distillation-carbonization chamber passes through the gas burning pipe 107 to be supplied to the burner 104 and burned therein. Combustion heat of the dry-distilled gas is used to increase and maintain a temperature of the dry distillation-carbonization chamber 102.

Hereby, the dry-distilled gas can be used as fuel of the combustion chamber 103, thereby making it possible to restrain a fuel cost.

The device 100 includes a hot-air discharge duct 108 communicating with a heat chamber 115 and a combustion chamber 103. The hot-air discharge duct 108 includes a damper 109 provided in a passage between the dry distillation-carbonization chamber 102 and the combustion chamber 103. This makes it possible to adjust the temperature by releasing excessive heat to outside appropriately. Hereby, the temperature of the dry distillation-carbonization chamber 102 is maintained in a range of approximately 400° C. to approximately 650° C.

The device 100 includes an external boiler 112, a steam pipe 113, and a superheated steam generator 114. The external boiler 112 heats water supplied thereto. The steam pipe 113 as a heat exchanger communicates the external boiler 112 with the dry distillation-carbonization chamber 102 via the superheated steam generator 114. When a dry distillation step is started and the temperature of the dry distillation-carbonization chamber 102 exceeds 100° C., steam preheated by the external boiler 112 is supplied to the superheated steam generator 114. Then, the steam of 100° C. to 700° C. is supplied to the dry distillation-carbonization chamber 102 from the superheated steam generator 114 via the steam pipe 113. Hereby, convective flow in the dry distillation-carbonization chamber 102 is promoted, so that the dry-distilled gas generated by dry distillation in the dry distillation-carbonization chamber 102 can be sent out efficiently. The supply of the steam continues until the dry distillation is finished and cooling is started.

As such, the device 100 heats the CFRP 40 in the atmosphere in which the air is shut off Hereby, the matrix resin of the CFRP 40 is thermally decomposed. Carbides called carbon residues are attached to the carbon fibers contained in the CFRP 40. That is, carbon powders generated by thermal decomposition of the matrix resin are attached to the carbon fibers. When the carbon residues are attached to the carbon fibers, the carbon fibers to be reused are not disentangled but kept entangled. Accordingly, in the present embodiment, a device 200 opens the carbon fibers, so as to perform wet classification.

The following describes the device 200 to perform the second step with reference to FIG. 2. The device 200 includes a stirrer 210, and a separator 220 configured to separate the opened carbon fibers from the liquid. The stirrer 210 opens the carbon fibers. The stirrer 210 includes a opening tank 211, a rotating shaft 212, and a stirring plate 213. The separator 220 separates the opened carbon fibers from the liquid. The separator 220 includes a pump 221, a filtration vessel 222, a gas supply pipe 223, a waste liquid tank 225, and filtration portions 226. For example, the separator 220 is a pressurized filtration machine.

First, the following describes the stirrer 210 configured to perform a stirring step. The opening tank 211 is a container configured to accumulate a liquid 214 therein. As the liquid, water or organic solvent can be used. The thermally decomposed CFRP 40 is immersed in the liquid 214. That is, when a material (CFRP) after the thermal decomposition is transferred to the opening tank 211, the liquid 214 including fibers to which carbides are attached is accumulated in the opening tank 211.

Further, the stirring plate 213 is provided inside the opening tank 211 in a rotatable manner. For example, the stirring plate 213 is attached to the rotating shaft 212. The stirring plate 213 is a mixing blade or a propeller, and stirs the liquid 214. That is, by rotating the rotating shaft 212 by a motor or the like, the stirring plate 213 rotates. The carbon fibers after the thermal decomposition step are soaked into the liquid 214 in the opening tank 211. Accordingly, stirring with shear force can be performed on the carbon fibers to which the carbon residues are attached.

As such, the stirrer 210 serves as a mixer to stir the carbon fibers in the liquid 214. Hereby, the carbon fibers are opened. That is, a fiber bundle of the carbon fibers can be disentangled. Since stirring with shear force is performed in the liquid 214, the carbon residues attached to the surfaces of the carbon fibers can be removed. Hereby, the fibers can be opened easily. Further, unlike JP 2013-64219 A, the fibers are not heat-treated in the oxygen atmosphere, thereby making it possible to reduce a strength degradation of the fibers.

The liquid 214 thus stirred by the stirrer 210 for a predetermined time is transferred by the pump 221 to the filtration vessel 222. For example, the pump 221 is a slurry pump. The carbon fibers thus subjected to the stirring are transferred to the filtration vessel 222 with the liquid. Further, the liquid transferred by the pump 221 includes residual carbon powders.

The gas supply pipe 223 configured to pressurize a space in the filtration vessel 222 is connected to the filtration vessel 222. Gas such as air or nitrogen is supplied to the gas supply pipe 223. Hereby, the space in the filtration vessel 222 is pressurized.

Further, the filtration portions 226 are placed inside the filtration vessel 222. The filtration portions 226 are placed in multiple stages inside the filtration vessel 222. The filtration portion 226 includes a filter to perform filtration. A wire gauze having a predetermined size can be used as the filter of the filtration portion 226, for example. Herein, a wire gauze having 30 meshes is used. The carbon fibers are filtered off by passing the liquid including the carbon fibers through the filtration portions 226. The liquid thus passing through the wire gauzes is discharged to the waste liquid tank 225 as waste liquid. The waste liquid including the residual carbon powders is accumulated in the waste liquid tank 225.

Further, an outlet port 222a provided in an openable manner is provided in a lower part of the filtration vessel 222. After the liquid is taken out into the waste liquid tank 225, the wire gauzes of the filtration portions 226 are rotated. Hereby, the carbon fibers on the wire gauzes are thrown off to the lower part of the filtration vessel 222. Then, the outlet port 222a in the lower part of the filtration vessel 222 is opened, so that the opened carbon fibers are taken out from the filtration vessel 222. When the separator 220 separates the liquid from the carbon fibers, the carbon fibers can be recycled.

As described above, by stirring the carbon fibers of the CFRP in the liquid after the thermal decomposition step, the carbon fibers can be opened easily. That is, by performing the stirring, the carbon residues attached to the surfaces of the carbon fibers can be removed, so that the carbon fibers are easily disentangled. Further, the carbon fibers are not heat-treated in the oxygen atmosphere, so that it is possible to prevent degradation of fiber strength after the recycle. Hereby, carbon fibers having a high strength can be manufactured by use of the CFRP as a material. Further, it is not necessary to perform the heat treatment by supplying nitrogen gas or the like, so that a process cost can be reduced.

(Example) The following describes Example 1 of the second step. In the example, 30 g of RCF (recycled carbon fibers) heat-treated in the dry distillation-carbonization furnace 101 was subjected to opening in the device 200 twice.

In first opening, 150 g of water was accumulated in the opening tank 211. Then, 30 g of the RCF was immersed into 150 g of water. With the use of a homomixer (T. K. AUTOMIXER) made by PRIMIX, the liquid 214 was stirred at 4000 rpm for 10 minutes. In the filtration portions 226, with the use of wire gauzes having 30 meshes, opened carbon fibers were separated from residual carbon powders and the water, and hereby, wet opened carbon fibers were obtained.

The opened carbon fibers obtained by the first opening were transferred to the opening tank 211 in which 120 g of water was accumulated. In second opening, a rotation speed was set higher than that in the first opening. For example, with the use of a homomixer (T. K. AUTOMIXER) made by PRIMIX, the water was stirred at 7000 rpm for 10 minutes.

When a weight of the RCF thus subjected to the opening twice was measured, a carbon-residue content was reduced by 5.6% from that of the RCF before the opening.

Before a recycling process, carbon fibers with a filament strength of 3949 MPa were processed by the processing method of the present embodiment and carbon fibers with a filament strength of 3949 MPa were processed by the processing method of JP 2013-64219 A. The filament strength of carbon fibers recycled by the present embodiment was 3860 MPa. In the meantime, when the heat treatment was performed in the oxygen atmosphere after a carbonization dry distillation step like JP 2013-64219 A, the filament strength was 3300 MPa, which was lower than the strength of the carbon fibers before the process. By reprocessing the carbon fibers according to the present embodiment, degradation of the fiber strength was able to be reduced.

Note that, in order to reduce a load to the homomixer, the rotation speed may be increased gradually. Hereby, it is possible to prevent a torque from increasing too much and stopping the homomixer.

Note that, even if VA-G18 made by Hitachi Ltd. is used instead of the homomixer (T. K. AUTOMIXER) made by PRIMIX, the same process can be performed. In a case where VA-G18 made by Hitachi Ltd. is used, the first opening and the second opening were each performed by stirring at 9500 rpm for two minutes. Further, by increasing the temperature of the liquid 214, it is possible to decrease the viscosity. Hereby, it is possible to reduce a load to the homomixer.

Note that, in the above description, a pressurized filtration machine is used as the separator 220, but a natural filter, a vacuum filter, a centrifugal filter, and the like other than the pressurized filtration machine can be used. Alternatively, the carbon fibers may be separated from the liquid by dehydration separation, centrifuge separation, or the like. Note that a thermo plastic resin and a thermo setting resin can be used as the matrix resin in the fiber containing resin. The fibers contained in the fiber containing carbon are not limited to the carbon fibers. That is, a fiber containing resin that contains fibers other than the carbon fibers can be processed by the processing method and the processing device according to the present embodiment.

Note that the present invention is not limited to the above embodiments, and various modifications can be made within a range that does not deviate from a gist of the present invention.

What is claimed is:
1. A processing method of a fiber containing resin, comprising:

placing a fiber containing resin in a dry distillation-carbonization chamber, wherein the fiber containing resin contains fibers and a matrix resin;

sealing the dry distillation-carbonization chamber to shut air off;

heating the fiber containing resin in the absence of oxygen to thermally decompose and carbonize the matrix resin in the fiber containing resin to obtain a bundle of fibers;

immersing the resulting bundle of fibers in a solvent held in a container; and stirring the resulting bundle of fibers to disentangle the fibers.

2. The processing method of the fiber containing resin, according to claim 1, further comprising:

after stirring, transferring the fibers and solvent to a vessel; and filtering the fibers and the solvent to separate the fibers from the solvent.

3. The processing method of the fiber containing resin according to claim 1, wherein the fiber containing resin is a carbon fiber reinforced plastic in which carbon fibers are contained in a matrix resin, the matrix resin being a main component of the carbon fiber reinforced plastic.

4. The processing method of the fiber containing resin, according to claim 1, wherein the heating is performed in a range of approximate 400° C. to approximately 650° C.

5. The processing method of the fiber containing resin, according to claim 1, wherein the bundle of fibers is stirred using a stirring plate.

6. The processing method of the fiber containing resin, according to claim 1, wherein carbides generated by the decomposition of the matrix resin are attached to the fibers in the bundle of fibers.

7. The processing method of the fiber containing resin, according to claim 1, wherein the fibers are carbon fibers.

8. The processing method of the fiber containing resin, according to claim 6, wherein the carbides are removed from the surfaces of the fibers during stirring.

* * * * *